(No Model.)
E. L. BARBER.
FILTER.
No. 295,327.      Patented Mar. 18, 1884.
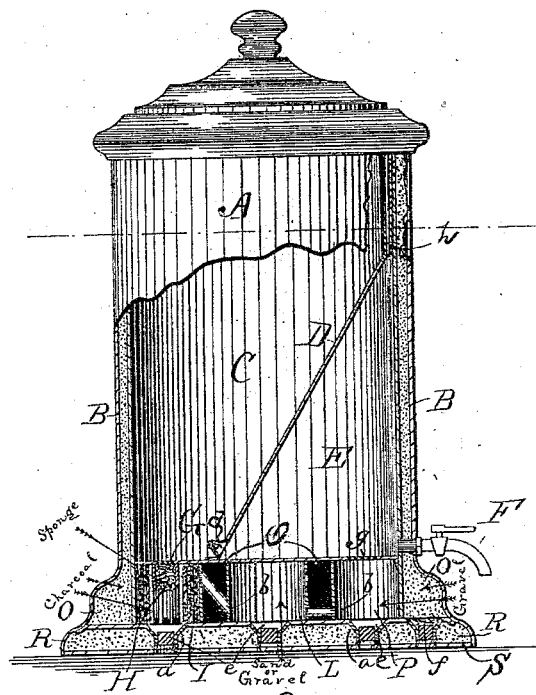
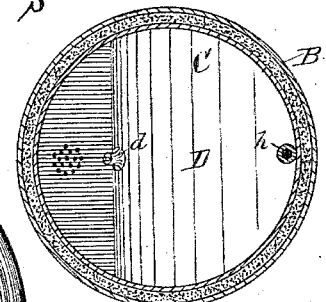
WITNESSES:
H. B. Brown
Solon C. Kemon
INVENTOR:
Edwin L. Barber,
BY Munn & Co.
ATTORNEYS.

UNITED STATES PATENT OFFICE.

EDWIN LUCIOUS BARBER, OF CHICAGO, ILLINOIS.

FILTER.

SPECIFICATION forming part of Letters Patent No. 295,327, dated March 18, 1884.

Application filed August 3, 1883. (No model.)

*To all whom it may concern:*

Be it known that I, EDWIN L. BARBER, a citizen of the United States, residing at Chicago, in the county of Cook and State of Illinois, have invented a new and useful Improvement in Filters, of which the following is a specification.

My invention relates to that class of filters used for purifying water for drinking and other purposes; and it has for its object to economize both space and expense in the production of a filter which shall be thoroughly efficient in its working and be easily cleaned.

To this end my invention consists in a water-receptacle provided with various compartments and passages, as hereinafter described and claimed, reference being had to the accompanying drawings, in which—

Figure 1 is a side elevation, part in section; and Fig. 2 is an inverted plan view of my filter with the bottom removed. Fig. 3 is a horizontal section at the dotted line in the upper part of Fig. 1.

A represents a common water-cooler having the usual annular space, B, to be filled with charcoal or other non-conducting material.

C is the body or main chamber of the cooler, into which the water and ice are placed.

D is a slanting partition separating off a lower corner as a pure-water space, from which a faucet, F, draws the water. $d$ represents a hole in the partition D, for the purpose of rinsing out and cleaning the pure-water space E. Hole $d$ is provided with a plug or screw-cap when not in use.

G is a hole covered with wire-gauze or perforated sheet metal, communicating with a tube, H, which serves as a receptacle for sponge to do the first or coarse filtering.

I is a chamber surrounding tube H, to be filled with charcoal as a filter, receiving water from tube H through openings at the sides of its lower end. From this chamber the water may be conducted through a series of other chambers, J K L M N P, each chamber having filtering material—such as gravel, sand, charcoal, &c.—and each connection $b$ between chambers provided with a screen of wire-gauze or something similar, to prevent the filtering material from washing through, finally entering chamber E through gauze $g$, purified ready for use. A less number of filtering-chambers may be used—as, for instance, the three chambers I L P may be connected and the other four dispensed with; or even the two chambers I and P may be made large enough to extend across the bottom of the cooler and be connected by passages $b$, as other chambers are shown. Each of the chambers J K L M N P is provided with an opening, $e$, which is plugged or covered with a screw-cap, that may be removed for cleaning and filtering the chamber.

O is a space surrounding and between all the filtering-chambers. This space is filled with charcoal, and may connect with the annular space B. It is filled through a capped opening, $f$.

R is a space below the filtering-chamber, which is filled with charcoal when inverted and covered with the false bottom S, which fits the case snugly to keep the charcoal in place.

$h$ is a ventilator for the water-space E. The object of this vent is to allow air to enter the pure-water chamber, so that water may be drawn therefrom freely without waiting for its slow passage through the filters, and this tube must rise above the high-water level of chamber C, or water would flow into or out of it. Each of the filtering-chambers being in the usual circular form of tin dishes, the device may be very cheaply made, and the number of chambers may by this plan be increased without limit.

The tube H is surrounded by the chamber I, and its end is directly opposite to the cap $e$ of the chamber, so that the sponge may be removed through the hole covered by cap $e$.

What I claim as my invention, and wish to secure by Letters Patent, is—

1. A cylindrical water-vessel having a slanting partition extending from the bottom to one side thereof below the top, completely closing the chamber beneath the partition, a vent-tube in said partition extending to the top of the vessel, holes in the bottom of each compartment, one or more chambers to hold filling material connecting said holes, and a faucet entering the inclosed compartment near its bottom, substantially as and for the purpose specified.

2. The water-cooler A, the slanting partition D therein, the opening G, and a screen covering it, in combination with the tube H, having side openings near its lower end, a sponge or other filtering material in said tube, a chamber, I, surrounding the tube, filtering material in said chamber, an opening through said chamber I directly opposite the mouth of tube H, and means for conveying water from the side of chamber I to chamber E, substantially as specified.

3. The water-cooler A, the slanting partition D therein, and the openings G $g$ in the bottom thereof, in combination with the filtering-chambers I J K L M N P, each having an opening in its bottom, and a removable cap therefor, and means, substantially as specified, for connecting said filtering-chambers with each other and with the openings G and $g$, as and for the purpose specified.

EDWIN LUCIOUS BARBER.

Witnesses:
GEO. L. BARBER,
E. J. WHITEHEAD.